(12) United States Patent
Wilford

(10) Patent No.: US 10,610,042 B2
(45) Date of Patent: Apr. 7, 2020

(54) CRUSHABLE PACK

(71) Applicant: Meta4sys Limited, St Helier (JE)

(72) Inventor: Martyn Sydney Wilford, Sherborne (GB)

(73) Assignee: Meta4sys Limited, St Helier (JE)

( * ) Notice: Subject to any disclaimer, the term of this patent is extended or adjusted under 35 U.S.C. 154(b) by 279 days.

(21) Appl. No.: 15/542,121

(22) PCT Filed: Jan. 8, 2016

(86) PCT No.: PCT/GB2016/050046
§ 371 (c)(1),
(2) Date: Jul. 7, 2017

(87) PCT Pub. No.: WO2016/110714
PCT Pub. Date: Jul. 14, 2016

(65) Prior Publication Data
US 2018/0255954 A1    Sep. 13, 2018

(30) Foreign Application Priority Data

Jan. 9, 2015 (GB) .................................. 1500355.1

(51) Int. Cl.
| | | |
|---|---|---|
| *A47J 19/02* | (2006.01) | |
| *B65D 65/24* | (2006.01) | |
| *B65D 83/00* | (2006.01) | |
| *B65D 77/00* | (2006.01) | |

(52) U.S. Cl.
CPC ........... *A47J 19/022* (2013.01); *A47J 19/027* (2013.01); *B65D 65/24* (2013.01); *B65D 77/003* (2013.01); *B65D 83/00* (2013.01); *B65D 83/0055* (2013.01)

(58) Field of Classification Search
CPC ....... A47J 19/022; A47J 19/027; B65D 65/24; B65D 77/003; B65D 83/00; B65D 83/0055
USPC .............. 383/43–58, 93, 95, 98, 99; 229/76, 229/112–116
See application file for complete search history.

(56) References Cited

U.S. PATENT DOCUMENTS

| 537,656 | A | * | 4/1895 | Waters ................... | B65D 27/22 |
| | | | | | 229/76 |
| 586,625 | A | * | 7/1897 | Roberts .................. | B65D 27/22 |
| | | | | | 229/76 |
| 1,123,010 | A | * | 12/1914 | Richardson .......... | B65D 31/005 |
| | | | | | 222/107 |
| 1,163,507 | A | * | 12/1915 | Carroll ..................... | B30B 9/22 |
| | | | | | 100/211 |

(Continued)

FOREIGN PATENT DOCUMENTS

| DE | 29901266 U1 | 5/1999 |
| DE | 202005015085 U1 | 12/2005 |

(Continued)

*Primary Examiner* — Jes F Pascua
(74) *Attorney, Agent, or Firm* — Carmody Torrance Sandak & Hennessey LLP

(57) ABSTRACT

There is provided a pack which has interconnected side panels (11), (12) defining a volume for receiving a product (25). The pack has an opening at one end which is at least partially closed with a non-return end closure mechanism in the form of a flap (17). The product (25) can be pushed past the flap into said volume, but cannot be removed without distorting the flap (17).

22 Claims, 6 Drawing Sheets

(56) References Cited

U.S. PATENT DOCUMENTS

Figure 3:
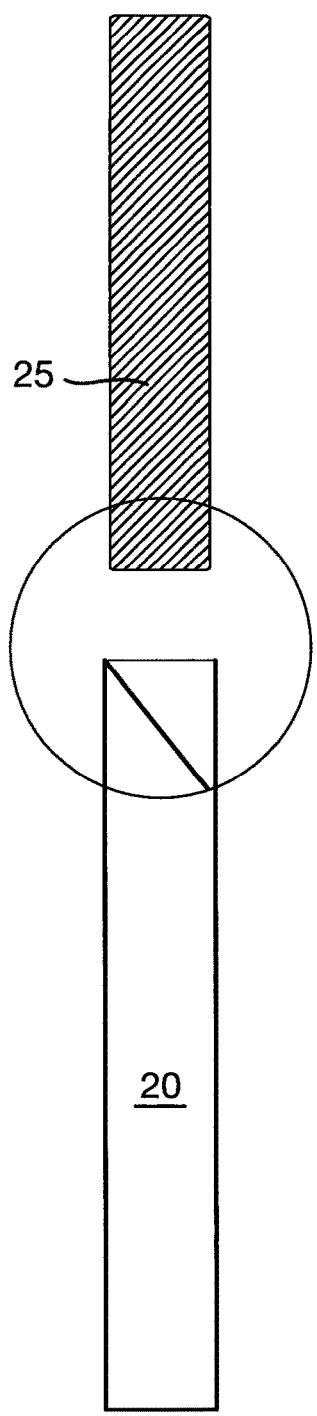

| | | | | |
|---|---|---|---|---|
| 1,676,102 A * | 7/1928 | Lynam | ............... | A47J 19/02 100/211 |
| 1,858,435 A * | 5/1932 | Conlon | ............... | A47J 19/02 100/211 |
| 2,442,646 A * | 6/1948 | Fields | ............... | B65D 83/06 222/213 |
| 2,648,463 A | 8/1953 | Scherer | | |
| 2,688,914 A * | 9/1954 | Eckler | ............... | A47J 19/02 100/211 |
| 3,137,419 A * | 6/1964 | Davy | ............... | B65D 31/145 222/107 |
| 3,159,096 A * | 12/1964 | Tocker | ............... | B65D 33/30 100/211 |
| 3,207,610 A | 9/1965 | Belkin | | |
| 3,669,013 A | 6/1972 | Stein | | |
| 3,759,375 A | 9/1973 | Nappi | | |
| 3,782,066 A | 1/1974 | Schmitt | | |
| 3,917,116 A | 11/1975 | Mason | | |
| 4,674,633 A | 6/1987 | Steadman | | |
| 4,722,472 A * | 2/1988 | Bruno | ............... | A61M 5/3205 206/366 |
| 4,895,296 A | 1/1990 | Trauschke | | |
| 4,921,137 A | 5/1990 | Heijenga | | |
| 5,154,293 A | 10/1992 | Gould | | |
| 5,975,305 A | 11/1999 | Barger | | |
| 8,118,199 B2 * | 2/2012 | Wilbur | ............... | A47G 19/24 206/390 |
| 8,535,744 B1 | 9/2013 | Taghaddos | | |
| 2007/0119862 A1 | 5/2007 | Backes et al. | | |
| 2010/0115891 A1 | 5/2010 | Sharp et al. | | |
| 2011/0079609 A1 | 4/2011 | Lee | | |
| 2012/0223099 A1 | 9/2012 | Sanchez | | |
| 2013/0015085 A1 | 1/2013 | Morimoto et al. | | |
| 2013/0341350 A1 | 12/2013 | Montarras et al. | | |
| 2014/0228785 A1 | 8/2014 | Soll et al. | | |
| 2018/0002091 A1 * | 1/2018 | Wilford | ............... | A47G 21/004 |

FOREIGN PATENT DOCUMENTS

| | | |
|---|---|---|
| DE | 202007010049 U1 | 9/2007 |
| DE | 20201108630 U1 | 2/2012 |
| EP | 0003390 A1 | 8/1979 |
| EP | 0303500 A2 | 2/1989 |
| EP | 2085322 A1 | 8/2009 |
| EP | 2279964 A1 | 2/2011 |
| FR | 2773683 A1 | 7/1999 |
| GB | 991495 | 5/1965 |
| GB | 2343440 A | 5/2000 |
| GB | 2478109 A | 8/2011 |
| JP | 2001018989 | 1/2001 |
| JP | 2002104541 A | 4/2002 |
| JP | 2008247420 A | 10/2008 |
| JP | 4190185 B2 | 12/2008 |
| WO | 199948768 | 9/1999 |
| WO | 200126994 A1 | 4/2001 |
| WO | 200176973 A2 | 10/2001 |
| WO | 2002070352 A2 | 9/2002 |
| WO | 2003094680 A1 | 11/2003 |
| WO | 2006117178 A1 | 11/2006 |
| WO | 2007126817 A2 | 11/2007 |
| WO | 2009006690 A1 | 1/2009 |
| WO | 2010123581 A2 | 10/2010 |

* cited by examiner

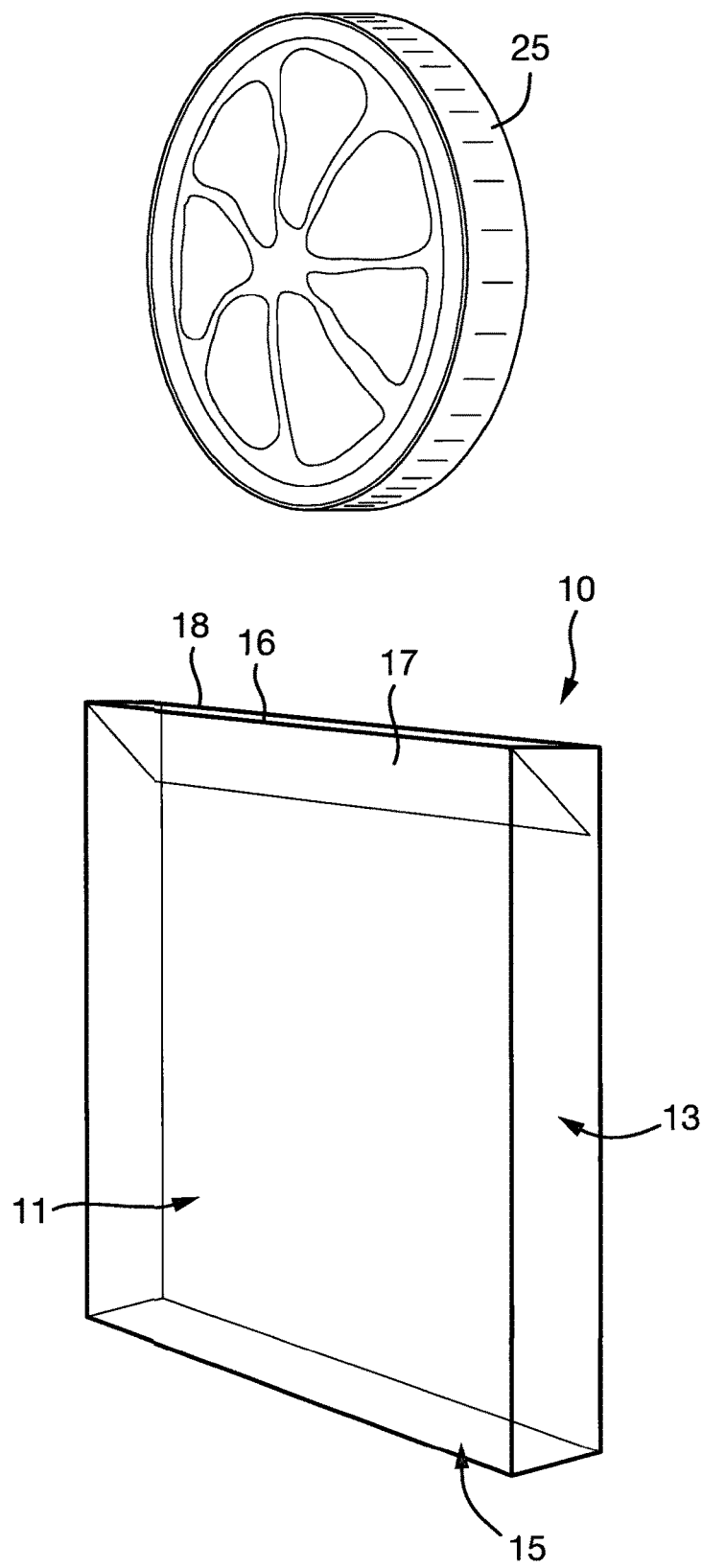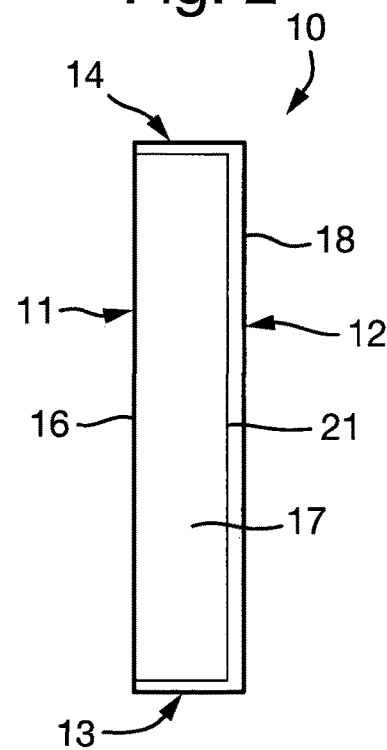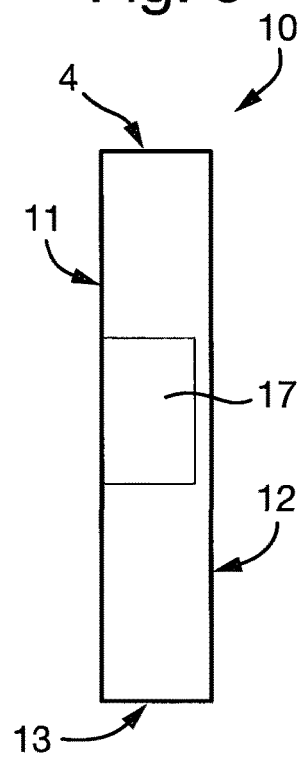

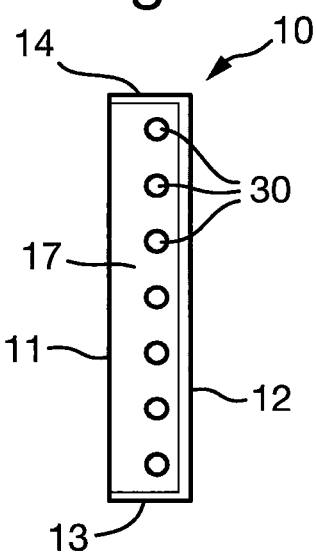
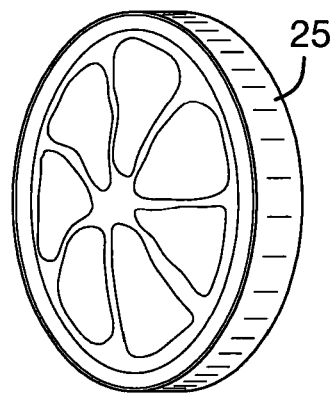
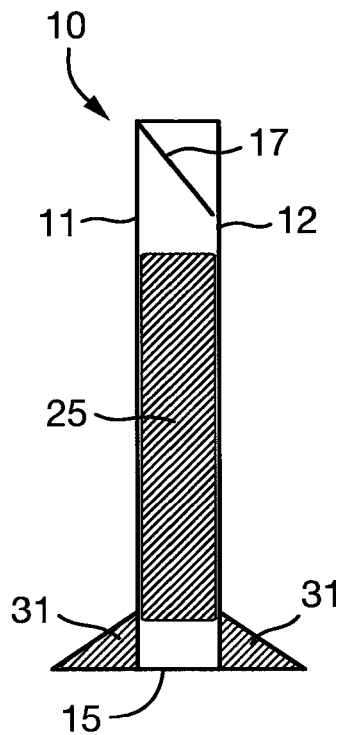
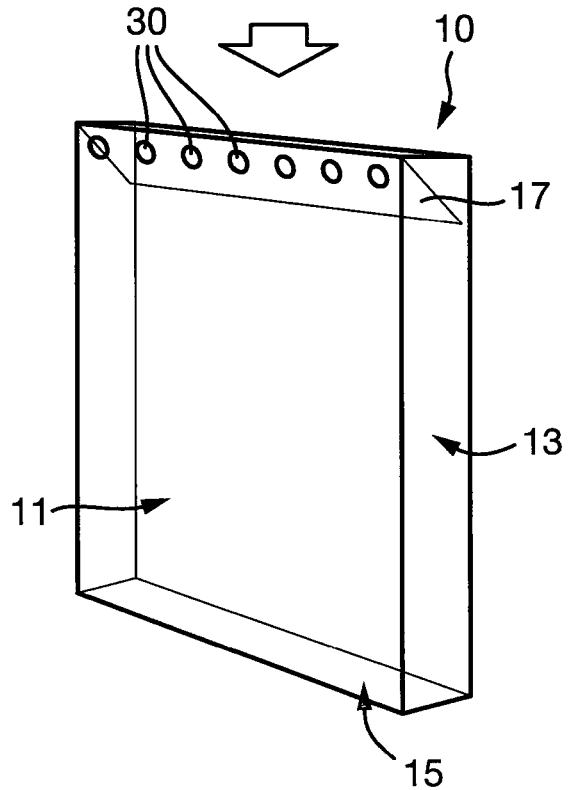

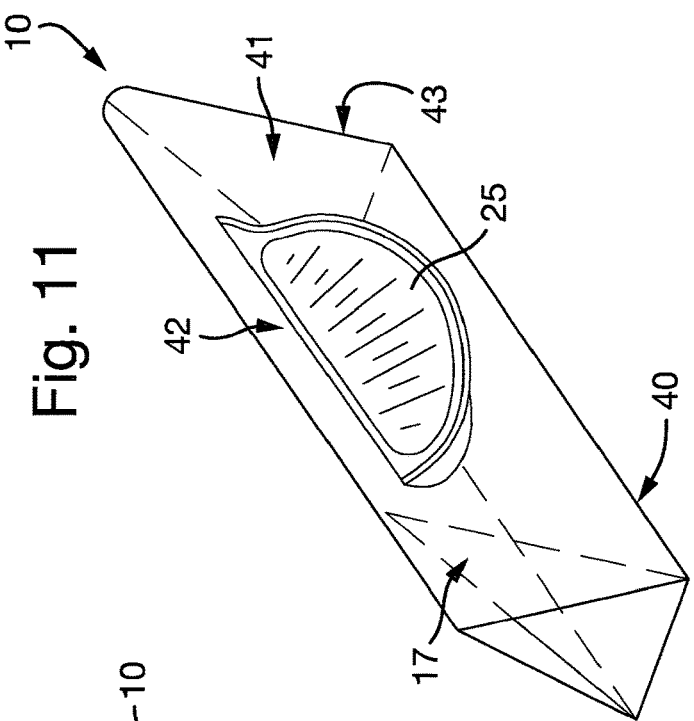
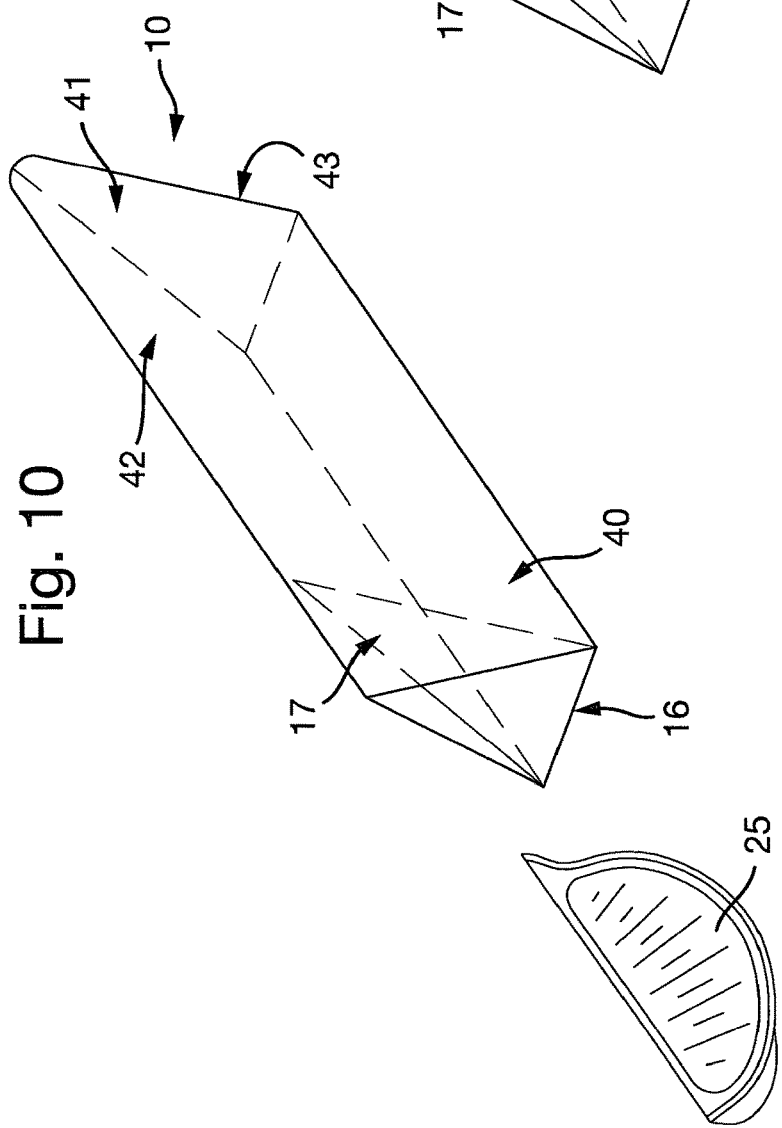
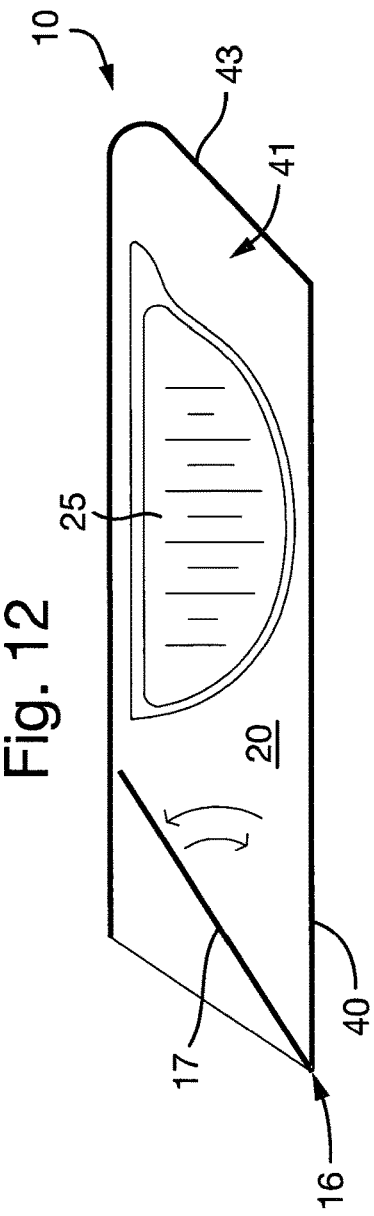

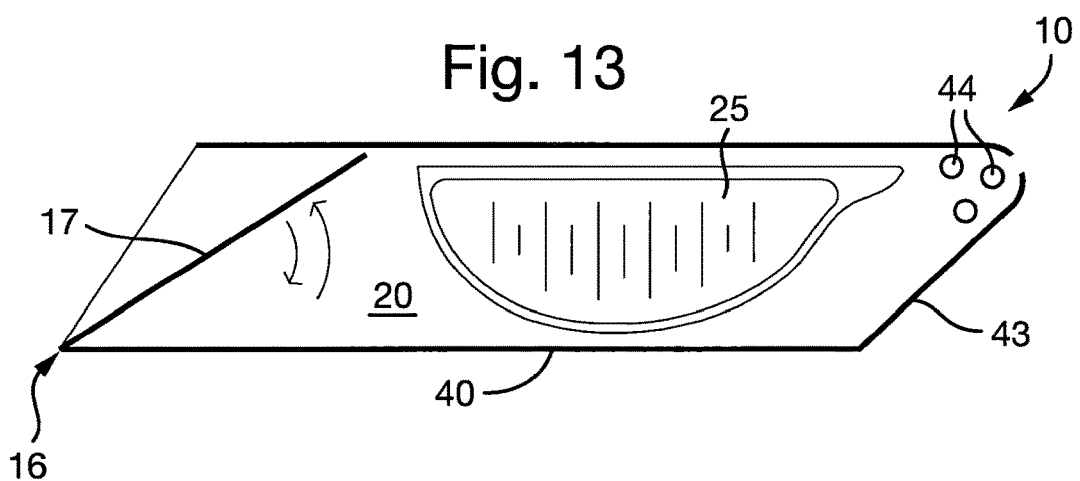
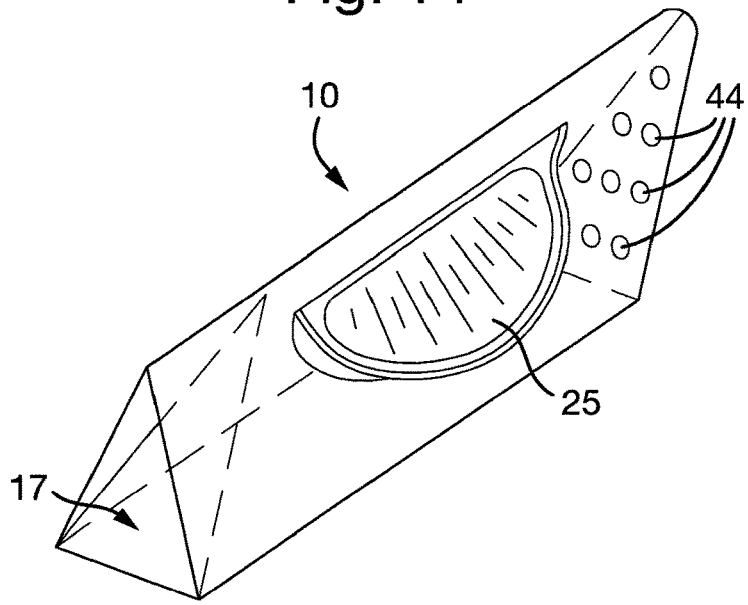
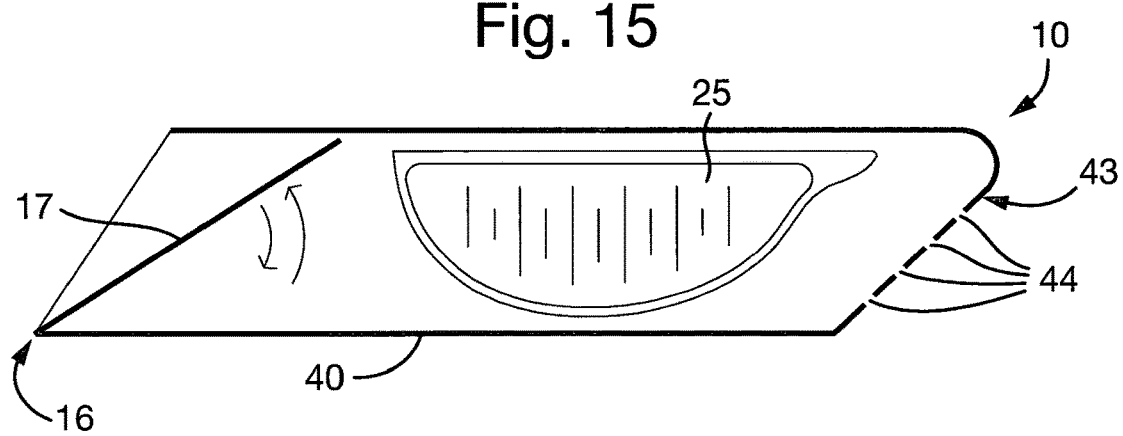

CRUSHABLE PACK

The present invention relates to a pack and more particularly to a pack for dispensing a product.

Some fresh fruits are used in the food and drink industries for the juice held within the fruit. It is often desirable to squeeze the fruit in order to extract the juice from the fruit and direct the juice over food or into a drink. In kitchens and bars, therefore, it is common for fruit such as citrus fruits (e.g. lemons, limes) to be sliced or cut ready for use. Squeezing the slices can be messy in that residue is left on fingers and the direction of the juice being extracted is not always predictable. Similar issues can also arise when a solid product, for example biscuits or honeycomb, is to be crumbled over food or into a drink.

According to the present invention there is provided a crushable pack comprising a plurality of interconnected side panels which define therein a volume for receiving a product, the pack having an opening at one end, which opening is at least partially closed by a non-return end closure mechanism which operates to allow the product to be inserted fully past the end closure mechanism into said volume and to prevent subsequent removal of the product back past said end closure mechanism, the end of the pack opposite said one end being closed sufficiently to prevent removal of the product the pack having a lengthwise axis extending between the two ends, and wherein said end closure mechanism comprises one or more end flaps hingedly connected to respective side panels, said one or more end flaps being hingable in one direction into said volume to allow said insertion of said product and being prevented from hinging in the other direction without distortion out of said volume thereby to prevent said removal of the product, the hinge axis of the or each end flap being substantially perpendicular to said lengthwise axis of the pack and wherein the pack is compressible to reduce said volume in use of the pack.

Preferably said end closure mechanism comprises one end flap, the end flap being hingedly connected to one of said side panels and being disposed inside said volume, wherein the end flap is dimensioned such that at least part of the end flap is too large to enable the end flap to hinge about said one side panel without distortion of the end flap or the side panels into a position outside of said volume, whereby the end flap can hinge further into the volume to enable said insertion of said product into the pack via said opening and then resiliently returns to a position preventing said removal of said product via said opening. Usually the end flap is connected to said one side panel by means of a fold which constitutes said hinged connection and also said fold is a straight line fold.

Conveniently the opening is planar and defines a shape which incorporates said fold line and in addition the shape of the opening has a remote point or points which are furthest away from the hinge and said end flap has a remote point or points which has a greater dimension from the hinge than the remote point or points of the opening.

In some embodiments the interconnected side panels of the pack include three planar side walls such that the volume is triangular in section and the opening is triangular, the end flap being connected to one of said side walls. Often the end flap is triangular, the distance of the apex of the triangular end flap from the hinge being greater than the triangular opening from the hinge and sometimes the plane of the opening is at an acute angle to said side wall to which the end flap is hingedly connected.

In other embodiments the interconnected side panels of the pack include four planar side walls such that the enclosed volume is rectangular in section and the opening is rectangular, the end flap being connected to one of said side walls which is spaced from an oppositely disposed side wall. Usually the end flap has a dimension perpendicular to the hinge which is greater than the distance between the hinge and the oppositely disposed side wall.

It is possible that said end flap only extends partially along the side wall to which it is hingedly connected and is centrally disposed between the side walls adjacent and perpendicular to said one side wall and also that more than one end flap is provided along the length of the rectangular opening.

Conveniently but not always all of said end flaps are hingedly connected to the same side wall.

Preferably but not always the pack is made from a fluid-tight sheet material. Often said fluid-tight material is a plastic material or a plastic coated board/paper or a combination thereof. In some arrangements said opposite end has at least one dispensing orifice and perhaps said at least one dispensing orifice is opened by means of a peel-off or a tear-off closure.

In many embodiments said opposite end is closed. With some method of construction said opposite end is moulded integrally with said interconnected side panels and said non-return end closure mechanism.

With some arrangements wherein said non-return end closure mechanism incorporates one or more dispensing orifice.

Figure 4:
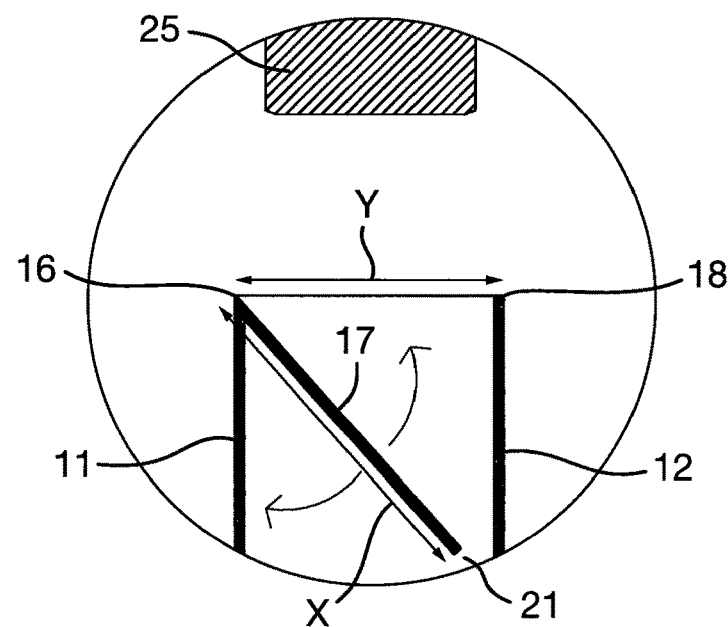
Figure 5:
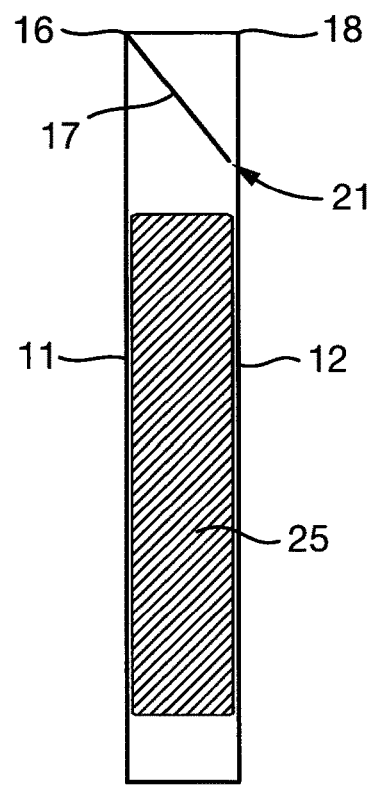
Figure 16:
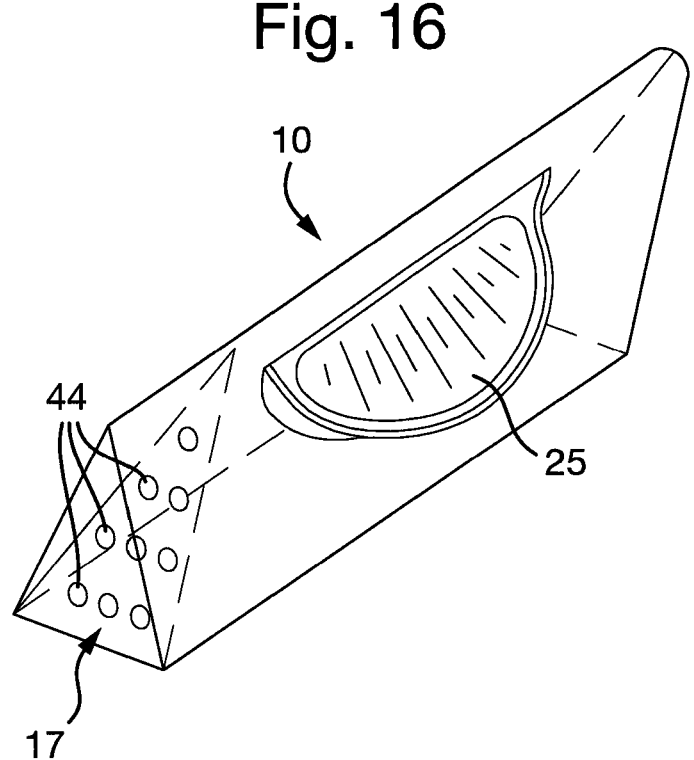
Figure 17:
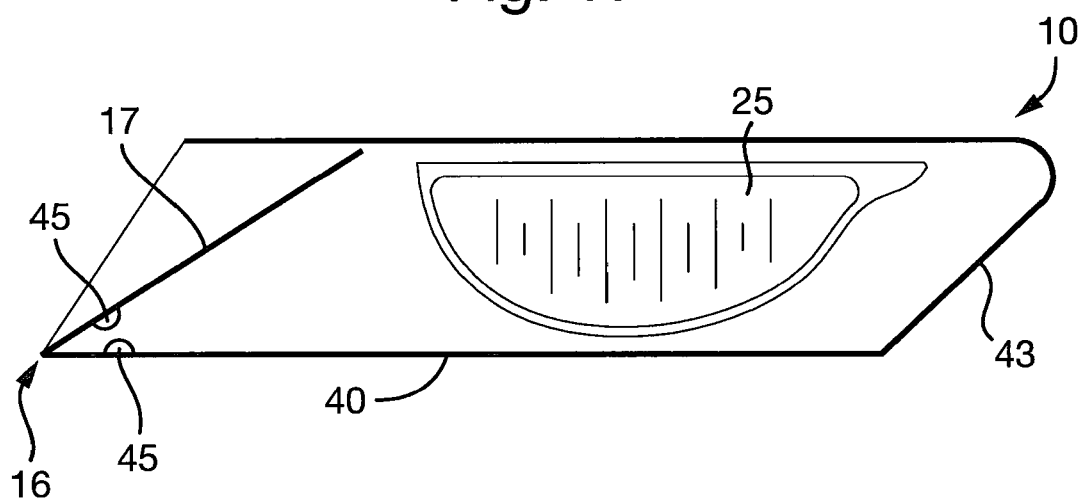

Various embodiments of the present invention will now be described in more detail. The description makes reference to the accompanying drawings in which:

FIG. 1 is a perspective view from one side of a pack according to the present invention together with a slice of fruit, FIG. 2 is a view from above the pack shown in FIG. 1, FIG. 3 is a central vertical section through the arrangement shown in FIG. 1, FIG. 4 is a close-up view of part of the FIG. 3 arrangement, FIG. 5 is a central vertical section through the pack shown in FIGS. 1 to 4 with the slice of fruit inserted, FIG. 6 is a view from above an alternative pack according to the present invention, FIG. 7 is a view from above another pack according to the present invention, FIG. 8 is a perspective view similar to FIG. 1 of a still further pack according to the present invention, FIG. 9 is a central vertical section similar to FIG. 3 of a further pack embodiment, FIG. 10 is a perspective view of another pack according to the present invention together with a wedge of fruit, FIG. 11 is a view similar to FIG. 10 with the wedge of fruit inserted, FIG. 12 is a schematic lengthwise sectional view of the arrangement shown in FIG. 11, FIG. 13 is a view similar to FIG. 12 of an alternative embodiment, FIGS. 14 and 15 are views similar to FIGS. 11 and 12 of a further embodiment according to the present invention, FIG. 16 is a view similar to FIG. 11 of a further embodiment according to the present invention, and FIG. 17 shows a view similar to FIG. 12 of an alternative pack according to the present invention.

In the various embodiments of the present invention described below, many features are shared by the embodiments and like features have been given like reference numerals.

FIGS. 1 to 5 illustrate a pack 10 which is of generally rectangular form having interconnected side panels comprising a generally square or rectangular front wall 11 with an opposite rear wall 12 and, interconnecting the front and rear walls, narrow rectangular side walls 13, 14. The pack 10 also has a narrow rectangular bottom wall 15. At the top of the pack 10 is a non-return closure mechanism which in this embodiment comprises an end closure flap 17 hingedly connected to the top edge 16 of the front wall 11. The hinge connection is such that the closure flap 17 can rotate about the top edge 16 of the front wall 11. The pack has a lengthwise axis extending between the two ends of the pack, namely between the end closure flap 17 and the bottom wall, and the axis of the hinge of the end closure flap 17 is substantially perpeicular to said lengthwise axis.

It will be seen that the width X of the closure flap 17 is greater than the distance Y between the top edge 16 of the front wall 11 and a corresponding top edge 18 of the rear wall 12. When ready for use of the pack 10, the closure flap 17 is disposed within a volume 20 defined by the walls of the pack 10, at an acute angle relative to the front wall 11. When the closure flap 17 is disposed within the volume 20, it is able to hinge further inwardly towards, and perhaps lying against, the inside of the front wall 11. However, it is unable to hinge outwardly beyond the point where its edge 21 remote from the top edge 16 engages the inside of the rear wall 12 because of the width of the flap 17 being greater than the width of the opening at the top of the pack. This is of course the result of the geometry/dimensions of the pack 10 and this will vary depending on the particular shape and size of the pack and of a product 25 to be inserted into the pack.

In FIGS. 1 to 5 the pack is designed for receiving a product 25 in the form of a generally round slice of fruit such as a lemon or a lime. As illustrated, the slice of fruit 25 is pushed against the closure flap 17 which hinges inwardly until the slice just passes the free edge of the closure flap 17. The resilience of the hinge/material of the pack 10 causes the closure flap 17 to hinge back towards a closed position as shown in FIG. 5. In such an inserted position it is not possible for the slice of fruit to be removed via the closure flap 17 without distorting the closure flap 17 or without distorting the pack 10 in other ways. Essentially, therefore, the slice of fruit 25 is trapped within the volume 20 and is not readily removable by simple methods such as inversion of the pack 10. If the pack 10 is inverted with the fruit inside, then the fruit 25 will engage the closure flap 17 but the closure flap 17 will not be able to hinge outside of the volume 20 about the top edge 16 because the free edge 21 of the flap 17 engages the rear wall 12. Only distortion of the pack, either the main walls 11 to 14 and/or the closure flap 17, would enable the closure flap to move to a position outside the volume 20 and thus allow removal of the fruit. Another way of removing the fruit would be simultaneously inverting the pack 10 and pressing down the closure flap 17 against the inside of the front wall 11, effectively reversing the insertion process, but this would be a messy and fiddly procedure.

The pack 10 is ideally made from a thin plastic sheet or a plastic coated paper or paperboard such that the material of the pack is impermeable to liquid. Ideally the material has a degree of resilience or shape memory to enable the flap 17 to return to its position closing the end opening. The pack 10 could be moulded as a single item or could be folded and glued/welded from a pre-formed blank. Generally the end closure flap would be integrally formed with the other walls, but it is envisaged that it could be connected as a separate component.

The material of the pack 10 and/or its construction is such that the pack can be compressed or squeezed after insertion of the fruit 25 in order to extract juice from the fruit. The juice can then be dispensed from the pack 10 and directed on to food either during cooking or when on a plate, or into a beverage or some other end use. The juice can be dispensed via one or more orifices formed in the pack and examples of these will be described in more detail later, or around the closure flap 17. The pack 10, therefore, enables fruit to be squeezed in a cleaner and more hygienic way without the risk of the fruit escaping from the pack. Ideally the size of the or each orifice is such as to prevent pips or other unwanted solids from being dispensed. As such it has a considerable benefit in restaurants, kitchens and bars or indeed anywhere else where freshly squeezed juice is required in individual portions.

FIG. 6 illustrates a pack 10 which is similar in most respects to that shown in FIGS. 1 to 5 except that the end closure flap 17 is located only in the central region between the side walls 13, 14. Its functionality is the same as the closure flap 17 of FIGS. 1 to 5 in that it acts as a non-return mechanism to prevent simple or inadvertent removal of the fruit 25 from the pack 10. In other words the width of the closure flap 17 is greater than the width of the rectangular opening between the front and rear walls 11, 12.

In other arrangements, a number of similar closure flaps 17 could be provided along the top opening of the pack 10. They may all be hingedly connected to the top edge 16 of the front wall 11, but it is possible that one or more closure flaps 17 are hingedly connected to the top edge of the rear wall 12. This could result in a series of interlocking flaps alternately connected to the front and rear walls 11, 12.

FIG. 7 shows a version of the pack 10 which is largely identical to that shown in FIGS. 1 to 5. In FIG. 7, however, there are a number of liquid dispensing orifices 30 provided in the end closure flap 17. The number, shape and size of the orifices 30 is a matter of design choice, but usually the orifices 30 would be designed so as to not allow the pips of the fruit to pass through, thereby preventing the pips from being dispensed into the user's food or drink.

Although shown in the closure flap 17 in FIG. 7, orifices could additionally or alternatively be provided in other walls such as the bottom wall 15 or in a corner region such as the region of the corner of the bottom, front, rear and one side panel. FIG. 8 shows one such alternative in which the orifices are provided in the top region of the front wall 11.

FIG. 9 is similar in most respects to the pack 10 shown in FIGS. 1 to 5, except the bottom region is moulded with forward and rearward stabilising feet 31 to enable the pack 10 to stand on its bottom wall 15 with more stability. The feet 31 may extend the full length of the junction between the bottom wall 15 and the front/rear walls 11, 12 or one or more sets of feet 31 could be provided at intervals along the length. The feet 31 need not be provided in aligned pairs, front and rear, but could be in an offset or alternating pattern.

FIGS. 10 to 12 shows an alternative pack 10 which is designed to receive wedges of fruit such as lemons or limes. Hence a lateral cross-section through the pack would be triangular and comprise interconnected side panels, namely a base wall 40 and angled side walls 41, 42. At one end there is a non-return mechanism in the form of an end closure flap 17 which is hingedly connected to an end edge 16 of the bottom wall 40.

In this embodiment the opening end of the pack defines a triangular opening and the closure flap 17 is also triangular but of larger dimensions than the triangular opening. In other words the height of the triangular closure flap 17 from the hinge/edge 16 to the remote apex of the triangle is greater than the equivalent height of the triangular opening of the pack 10. When the closure flap 17 is disposed inside the volume 20 of the pack at an acute angle relative to the base wall 40 as shown in FIG. 12, it will be apparent that the fruit wedge 25 can be pushed past the closure flap 17 which hinges towards or into contact with the inside surface of the bottom wall. Once the fruit has cleared the closure flap 17, the flap returns resiliently into a position which substantially blocks the opening against simple removal of the fruit.

As with earlier embodiments the fruit cannot then be removed via the closure flap 17 without distorting the closure flap 17 or without distorting the pack in other ways. Essentially, therefore, the fruit wedge 25 is trapped within the volume 20 and is not readily removable by simple methods such as inversion of the pack 10.

Again, opposite the end with the closure flap 17 the pack 10 is substantially closed with an angled end wall 43 which in this embodiment is well suited to accommodate the shape of the fruit wedge 25. As with the earlier described embodiments, the pack 10 of FIGS. 10 to 12 is ideally made from a thin plastic sheet or a plastic coated paper or paperboard such that the material of the pack is impermeable to liquid. The pack 10 could be moulded as a single item or could be folded and glued/welded from a pre-formed blank. Generally the end closure flap would be integrally formed with the other walls, but it is envisaged that it could be connected as a separate component.

As with the first embodiment, the triangular section pack has a lengthwise axis between the opposite ends, namely between the end closure flap 17 and the end wall 43, the axis of the hinge of the end closure flap 17 being substantially perpendicular to said lengthwise axis.

The material of the pack 10 and/or its construction is such that the pack can be compressed or squeezed after insertion of the fruit 25 in order to extract juice from the fruit. The juice can then be dispensed from the pack 10 and directed on to food either during cooking or when on a plate, or into a beverage or some other end use. The juice can be dispensed via one or more orifices formed in the pack and examples of these will be described in more detail later, or around the closure flap 17. The pack 10, therefore, enables fruit to be squeezed in a cleaner and more hygienic way without the risk of the fruit escaping from the pack. Ideally the size of the or each orifice is such as to prevent pips or other unwanted solids from being dispensed.

FIG. 13 shows a pack 10 which is identical to that shown in FIGS. 10 to 12 except that it shows a number of dispensing orifices 44 in the upper corner of the side walls 41, 42 and/or angled end wall 43 remote from the corner flap 17. As previously discussed, the shape, dimensions and location of the orifice or orifices 44 are a matter of design choice.

FIGS. 14 and 15 show a pack 10 having a series of orifices 44 just in the angled end wall 43.

FIG. 16 shows a pack 10 having a series of orifices in the end closure flap 17 such that the closure flap 17 has multi functionality in that it enables insertion of the fruit, prevents subsequent removal of the fruit and dispenses the juice extracted from the fruit.

It will be appreciated that packs of other shapes and other cross-sections or dimensions are envisaged as part of the present invention. Although the illustrated pack embodiments are shown as having substantially constant cross-sections along most of their length from the end closure flap 17 to the opposite end, it is envisaged that the packs could be provided with a slightly tapering cross-section which is larger at the end with the end closure flap 17. This would enable the packs to be nested together with the opposite end of one pack 10 being inserted into the volume 20 through the end with the closure flap 17. Such an arrangement would reduce bulkiness for transportation and storage, and would facilitate use in a pack dispensing apparatus for removing the lowermost pack in a manner similar to that used in dispensing disposable cups.

The packs 10 when in a condition ready to use have the end closure flap 17 disposed/retained within the volume. The packs could be manufactured in this way or the end closure flap 17 could be manipulated by gentle distortion of the pack walls or the flap 17 itself in order to move the flap 17 from an external position into its ready for use position within the volume.

FIG. 17 shows an embodiment in which the end closure flap 17 and the base wall 40 each have cooperating projections 45 near the hinge/edge 16. In this embodiment, the end closure flap 17 is prevented from hinging fully into contact with the inside surface of the base wall 40 by virtue of the two projections 45 abutting one another. Such a construction improves the positioning of the flap 17 after insertion of the product 25 by encouraging the flap 17 to resiliently return a position blocking removal of the product 25 from the volume. This type of construction also makes it more difficult to manoeuvre the flap 17 into a position adjacent the base wall 40 if trying to remove the product 25.

Although projections 45 are provided on both the flap 17 and the base wall 40, a similar effect could be achieved with just one projection 45 located on either the flap 17 or the base wall 40. The projection or projections 45 could extend the full or part width of the flap 17 and/or base wall 40 between the side walls, 41, 42. Other sizes/shapes for the projection are envisaged and may depend on the proximity of the projections(s) to the hinge/edge 16. In addition, projections could be provided adjacent the end closure flap 17 and the base wall 40/front wall 11 of the arrangements shown earlier in the description.

It is also envisaged that the product 25 need not be fruit and could be a solid material capable of being crushed and then dispensed through suitable sized dispensing orifices. Examples of such solids are biscuits, honeycomb, confectionary items which can be crumbled and dispensed for use on food or beverages or in for use during cooking. Such packs would not require the material of construction to be liquid-impermeable, and as stated previously may be of cross-sections which are not triangular or rectangular as illustrated, such as hexagonal or even round/ovoid provided the oversized end closure flap is appropriately hinged to the side wall portion.

The invention claimed is:

1. A crushable pack comprising a plurality of interconnected side panels which define therein a volume for receiving a product, the pack having an opening at one end, which opening is at least partially closed by a non-return end closure mechanism which operates to allow the product to be inserted fully past the end closure mechanism into said volume and to prevent subsequent removal of the product back past said end closure mechanism, the end of the pack opposite said one end being closed sufficiently to prevent removal of the product and the pack having a lengthwise axis extending between the two ends, wherein said end closure mechanism comprises one or more end flaps disposed within said volume and hingedly connected to respective side panels, said one or more end flaps being hingable in one direction further into said volume to allow said insertion of said product and being prevented from hinging in the other direction without distortion out of said volume thereby to prevent said removal of the product, the hinge axis of the or each end flap being substantially perpendicular to said lengthwise axis of the pack and wherein the pack is compressible to reduce said volume in use of the pack, wherein the pack comprises at least one dispensing orifice, wherein the non-return end closure mechanism incorporates the at least one dispensing orifice or the opposite end has the at least one dispensing orifice.

2. A pack as claimed in claim 1, wherein said end closure mechanism comprises one end flap, the end flap being hingedly connected to one of said side panels and being disposed inside said volume, wherein the end flap is dimensioned such that at least part of the end flap is too large to enable the end flap to hinge about said one side panel without distortion of the end flap or the side panels into a position outside of said volume, whereby the end flap can hinge further into the volume to enable said insertion of said product into the pack via said opening and then resiliently returns to a position preventing said removal of said product via said opening.

3. A pack as claimed in claim 2, wherein the end flap is connected to said one side panel by means of a fold which constitutes said hinged connection.

4. A pack as claimed in claim 2, wherein said fold is a straight line fold.

5. A pack as claimed in claim 4, wherein the opening is planar and defines a shape which incorporates said fold line.

6. A pack as claimed in claim 5, wherein the shape of the opening has a remote point or points which are furthest away from the hinge and said end flap has a remote point or points which has a greater dimension from the hinge than the remote point or points of the opening.

7. A pack as claimed in claim 2, wherein the interconnected side panels of the pack include three planar side walls such that the volume is triangular in section and the opening is triangular, the end flap being connected to one of said side walls.

8. A pack as claimed in claim 7, wherein the end flap is triangular, the distance of the apex of the triangular end flap from the hinge being greater than the triangular opening from the hinge.

9. A pack as claimed in claim 8, wherein the plane of the opening is at an acute angle to said side wall to which the end flap is hingedly connected.

10. A pack as claimed in claim 2, wherein the interconnected side panels of the pack include four planar side walls such that the enclosed volume is rectangular in section and the opening is rectangular, the end flap being connected to one of said side walls which is spaced from an oppositely disposed side wall.

11. A pack as claimed in claim 10, wherein the end flap has a dimension perpendicular to the hinge which is greater than the distance between the hinge and the oppositely disposed side wall.

12. A pack as claimed in claim 10, wherein said end flap only extends partially along the side wall to which it is hingedly connected and is centrally disposed between the side walls adjacent and perpendicular to said one side wall.

13. A pack as claimed in claim 1, wherein the pack is made from a fluid-tight sheet material.

14. A pack as claimed in claim 13, wherein said fluid-tight material is a plastic material or a plastic coated board/paper or a combination thereof.

15. A pack as claimed in claim 1, wherein said opposite end has the at least one dispensing orifice.

16. A pack as claimed in claim 15, wherein said at least one dispensing orifice is sealed and opened by means of a peel-off or a tear-off closure.

17. A pack as claimed in claim 1 wherein said opposite end is closed.

18. A pack as claimed in claim 1 wherein said opposite end is moulded integrally with said interconnected side panels and said non-return end closure mechanism.

19. A pack as claimed in claim 1 wherein said non-return end closure mechanism incorporates the at least one dispensing orifice.

20. A pack as claimed in claim 1 in combination with a product disposed within said volume.

21. A crushable pack comprising a plurality of interconnected side panels which define therein a volume for receiving a product, the pack having an opening at one end, which opening is at least partially closed by a non-return end closure mechanism which operates to allow the product to be inserted fully past the end closure mechanism into said volume and to prevent subsequent removal of the product back past said end closure mechanism, the end of the pack opposite said one end being closed sufficiently to prevent removal of the product and the pack having a lengthwise axis extending between the two ends, wherein said end closure mechanism comprises one or more end flaps disposed within said volume and hingedly connected to respective side panels, said one or more end flaps being hingable in one direction further into said volume to allow said insertion of said product and being prevented from hinging in the other direction without distortion out of said volume thereby to prevent said removal of the product, the hinge axis of the or each end flap being substantially perpendicular to said lengthwise axis of the pack and wherein the pack is compressible to reduce said volume in use of the pack, wherein said end closure mechanism comprises one end flap, the end flap being hingedly connected to one of said side panels and being disposed inside said volume, wherein the end flap is dimensioned such that at least part of the end flap is too large to enable the end flap to hinge about said one side panel without distortion of the end flap or the side panels into a position outside of said volume, whereby the end flap can hinge further into the volume to enable said insertion of said product into the pack via said opening and then resiliently returns to a position preventing said removal of said product via said opening, and wherein the interconnected side panels of the pack include three planar side walls such that the volume is triangular in section and the opening is triangular, the end flap being connected to one of said side walls.

22. A crushable pack comprising a plurality of interconnected side panels which define therein a volume for receiving a product, the pack having an opening at one end, which opening is at least partially closed by a non-return end closure mechanism which operates to allow the product to be inserted fully past the end closure mechanism into said volume and to prevent subsequent removal of the product back past said end closure mechanism, the end of the pack opposite said one end being closed sufficiently to prevent removal of the product and the pack having a lengthwise axis extending between the two ends, wherein said end closure mechanism comprises one or more end flaps disposed within said volume and hingedly connected to respective side panels, said one or more end flaps being hingable in one direction further into said volume to allow said insertion of said product and being prevented from hinging in the other direction without distortion out of said volume thereby to prevent said removal of the product, the hinge axis of the or each end flap being substantially perpendicular to said lengthwise axis of the pack and wherein the pack is compressible to reduce said volume in use of the pack, wherein said end closure mechanism comprises one end flap, the end flap being hingedly connected to one of said side panels and being disposed inside said volume, wherein the end flap is dimensioned such that at least part of the end flap is too large to enable the end flap to hinge about said one side panel without distortion of the end flap or the side panels into a position outside of said volume, whereby the end flap can hinge further into the volume to enable said insertion of said product into the pack via said opening and then resiliently returns to a position preventing said removal of said product via said opening, wherein the interconnected side panels of the pack include four planar side walls such that the enclosed volume is rectangular in section and the opening is rectangular, the end flap being connected to one of said side walls which is spaced from an oppositely disposed side wall, and wherein said end flap only extends partially along the side wall to which it is hingedly connected and is centrally disposed between the side walls adjacent and perpendicular to said one side wall.

* * * * *